United States Patent [19]
Matsuda

[11] Patent Number: 5,432,567
[45] Date of Patent: Jul. 11, 1995

[54] APPARATUS FOR DRIVING PHOTOCONDUCTIVE LIQUID CRYSTAL LIGHT VALVE HAVING WRITE INTENSITY DETECTING FUNCTION AND DISPLAY APPARATUS USING SUCH LIGHT VALVE

[75] Inventor: Norio Matsuda, Tsurugashima, Japan

[73] Assignee: Pioneer Electronic Corporation, Tokyo, Japan

[21] Appl. No.: 208,060

[22] Filed: Mar. 9, 1994

Related U.S. Application Data

[63] Continuation of Ser. No. 8,935, Jan. 26, 1993, abandoned.

[30] Foreign Application Priority Data

Feb. 27, 1992 [JP] Japan .................................. 4-041345
Apr. 10, 1992 [JP] Japan .................................. 4-091013

[51] Int. Cl.6 .............................. H04N 3/14; G02F 1/13
[52] U.S. Cl. .................................. 348/790; 359/72; 359/85
[58] Field of Search .............. 348/750, 751, 752, 758, 348/759, 760, 761, 762, 766, 767, 790, 791; H04M 5/74, 9/31; 359/72, 85, 73, 80, 84, 86, 87, 41

[56] References Cited

U.S. PATENT DOCUMENTS 3,936,640  2/1976  Haas et al. ............................ 359/85
4,205,311  5/1980  Kutaraga ............................... 359/85
5,009,490  4/1991  Kouno et al. .......................... 359/72

Primary Examiner—James J. Groody
Assistant Examiner—Michael H. Lee
Attorney, Agent, or Firm—Keck, Mahin & Cate

[57] ABSTRACT

A driving apparatus allows simple detection of the light writing characteristic of light writing means, such as a CRT, without detaching the light writing means from the liquid crystal light valve. A display apparatus uses such a photoconductive liquid crystal light valve. The driving apparatus applies a drive voltage signal from a drive voltage source across two electrodes of a photoconductive liquid crystal light valve having a liquid crystal layer, a photoconductive layer and the two electrodes arranged to sandwich the liquid crystal layer and photoconductive layer and allows a writing light to be incident upon the photoconductive layer by light writing means coupled to a writing side, and comprises detection means for detecting an impedance across the two electrodes. The apparatus generates an adjusting video signal having white and black levels, supplies the adjusting video signal as an input video signal to video signal amplifying means, and compares the levels of detection outputs of writing light intensity detection means at times of generation of the adjusting video signals of the white level and the black level, with reference levels corresponding to the white and black levels. The offset and gain of the video signal amplifying means are changed in accordance with the comparison outputs of the comparing means.

7 Claims, 14 Drawing Sheets

APPARATUS FOR DRIVING PHOTOCONDUCTIVE LIQUID CRYSTAL LIGHT VALVE HAVING WRITE INTENSITY DETECTING FUNCTION AND DISPLAY APPARATUS USING SUCH LIGHT VALVE

This application is a continuation of U.S. patent application Ser. No. 08/008,935, filed Jan. 26, 1993, now abandoned.

BACKGROUND OF THE INVENTION

1. Field of the Invention

The present invention relates to an apparatus for driving a photoconductive liquid crystal light valve, which is used in a projection type liquid crystal display (LCD) apparatus and is coupled to light writing means, and also, to a display apparatus using a photoconductive liquid crystal light valve.

2. Description of the Background Information

FIG. 1 shows an example of a projection type LCD apparatus that comprises a display photoconductive liquid crystal light valve.

Referring to this diagram, a drive voltage signal output from a drive voltage source 101 is applied across two electrodes (to be described later) of a photoconductive liquid crystal light valve 1. Means for writing an image on the liquid crystal light valve 1 may be, for example, an optical fiber light tube, which comprises a CRT (Cathode Ray Tube) 3 to which a video signal $V_V$ is supplied via a video amplifier 2, and an optical fiber 4, coupled to the CRT 3, to guide an image displayed on the CRT to the liquid crystal light valve 1. The output image of the CRT 3 is written on the photoconductive film of the liquid crystal light valve 1. The video amplifier 2 is capable of changing the level of the output video signal in accordance with a control signal $V_c$ to thereby alter the output image of the CRT 3 or the level of the writing light to the liquid crystal light valve 1.

Reading light, emitted from a light source 5, will be incident via a mirror 6 and through a condenser lens 7 upon a polarization beam splitter 8. The incident light has a P polarization component and an S polarization component. The former component directly passes through the polarization beam splitter 8, while the latter has its direction turned by 90 degrees to enter the liquid crystal light valve 1.

If an image drawn is on the liquid crystal layer of the liquid crystal light valve 1, the light reflected by the liquid crystal light valve 1 locally includes a P polarization component according to the tint of the image on the liquid crystal layer. This P polarization component in the reflected light alone directly passes through the polarization beam splitter 8 to enter a projection lens 9, so that the image corresponding to that P polarization component is projected on a screen 10.

FIG. 2 illustrates the structure of the photoconductive liquid crystal light valve 1 used in the projection type LCD apparatus.

In this diagram, a spacer 12 is placed around a liquid crystal layer 11, with alignment films 13 and 14 provided on the respective sides of the layer 11. Sandwiched between the liquid crystal layer 11 and a photoconductive film 15, which may be formed of amorphous silicon, are a dielectric mirror 16 as a light reflecting film and a light shielding film 17. The light reflecting film 16 serves to reflect projection light coming from the reading side, while the light shielding film 17 serves to absorb leak light from the light reflecting film 16 to block the light to the photoconductive film 15. Transparent conductive films 18 and 19, serving as two electrodes, are provided outside the liquid crystal layer 11 and the photoconductive layer 15 respectively to sandwich the liquid crystal layer 11. All the components mentioned above are sealed by glass substrates 20 and 21.

When an image is drawn on the photoconductive film 15 in the thus constituted photoconductive liquid crystal light valve 1 by the writing light incident from the right-hand side (writing side) in FIG. 2, the internal resistance of the photoconductive film 15 changes locally according to the tint of the image. The drive voltage across the transparent electrodes 18 and 19 is applied to the liquid crystal layer 11 adjacent to those portions which correspond to the resistance-changed portions, in accordance with the tint of the image, causing spatial modulation.

Referring again to FIG. 1, before the liquid crystal light valve 1, CRT 3 and optical fiber 4 are coupled together, the output to input characteristic of the CRT 3 is adjusted to a specific characteristic. This adjustment is done to make the light writing characteristic to the liquid crystal light valve 1 constant to acquire a stable and good projection image. This is actually accomplished by arranging a photometer to the front surface or the display surface of the CRT 3 before the liquid crystal light valve 1 is coupled to the CRT 3 by the optical fiber 4, measuring the level of the output light of the CRT 3 by means of photoelectric transfer of the photometer when a video signal $V_V$ of predetermined level and pattern is supplied to the CRT 3, and supplying a control signal $V_c$ of the level that should provide a predetermined level of output light to the video amplifier 2 based on the result of the measurement.

The video amplifier 2 includes an offset controller 201 a gain controller 202, and a drive amplifier 203 as shown in FIG. 3. The offset and gain for amplifying the input video signal $V_V$ are controlled by control signals $V_{c1}$ and $V_{c2}$, respectively. The levels of those control signals may be changed, for example, by a user manually altering volume controls Vol1 and Vol2 on the operation section (not shown). The solid line io in FIG. 4 represents the initial characteristic of the CRT 3 that is to be controlled in the above manner to satisfy the predetermined output light level characteristic. In the diagram, the horizontal scale $V_{cg}$ [V] is the voltage that is applied between the cathode and grid of the CRT 3 according to the input video signal $V_V$, and the vertical scale I [W/cm$^2$] is the level of the output light or the output power of the CRT 3 that is produced according to that voltage $V_{cg}$. For the illustrated initial characteristic, it is apparent that the proper white level $I_w$ and black level $I_B$ are acquired by supplying such a video signal as to apply the voltages $V_{cgW0}$ and $V_{cgB0}$ to the CRT 3.

The liquid crystal light valve 1 is coupled to the CRT 3 after the output writing light to input video signal characteristic of the CRT 3 to the liquid crystal light valve 1 are adjusted. The coupling should be made with a high precision, which is inevitable to provide a high-quality image.

If the light writing characteristic varies due to some time series changes by a change in heater current that drives the CRT 3 or a change in fluorescent body due to a temperature rise on the tube surface, after the liquid crystal light valve 1, CRT 3 and optical fiber 4 are coupled together, the characteristic as represented by the broken line ia in FIG. 4 will be provided. In this case, the black level and white level of the CRT 3 change from those of the initial characteristic, degrading the gray scale characteristic and shifting the white balance. To cope with them requires a troublesome work to detach the CRT 3 in close contact with the liquid crystal light valve 1, detect the light writing characteristic using the photometer, readjust the characteristic, and then couple the CRT 3 again to the liquid crystal light valve 1.

Further, since the user manually controls the light writing characteristic of the CRT, not only the image quality will vary in each product, but also the prompt and accurate adjustment cannot be expected.

OBJECT AND SUMMARY OF THE INVENTION

It is therefore an object of the present invention to provide a driving apparatus for a photoconductive liquid crystal light valve, which can allow simple, prompt and accurate adjustment of the light writing characteristic of light writing means, such as a CRT, without detaching the light writing means from the liquid crystal light valve, and a display apparatus using such a photoconductive liquid crystal light valve.

According to one aspect of the present invention, there is provided a driving apparatus for a photoconductive liquid crystal light valve having a writing light intensity detecting function, which apparatus applies a drive voltage signal from a drive voltage source across two electrodes of the photoconductive liquid crystal light valve having a liquid crystal layer, a photoconductive layer and the two electrodes arranged to sandwich the liquid crystal layer and photoconductive layer and designed to allow a writing light to be incident upon the photoconductive layer by light writing means coupled to a writing side, and comprises detection means for detecting an impedance across the two electrodes.

The present driving apparatus for a photoconductive liquid crystal light valve having a writing light intensity detecting function detects an impedance across the two electrodes of the photoconductive liquid crystal light valve.

According to another aspect of the present invention, there is provided a photoconductive liquid crystal light valve display apparatus with a writing light intensity adjusting function, which comprises a photoconductive liquid crystal light valve having a liquid crystal layer, a photoconductive layer and two electrodes arranged to sandwich the liquid crystal layer and photoconductive layer; video signal amplifying means for amplifying an input video signal and outputting an output video signal; light writing means, coupled to a writing side of the photoconductive liquid crystal light valve, for allowing a writing light corresponding to the output video signal to be incident upon the photoconductive layer; drive means for applying a drive voltage signal across the two electrodes; writing light intensity detection means for detecting an impedance across the two electrodes; adjusting video signal generating means for generating an adjusting video signal having a white level and a black level; selective supply means for supplying the adjusting video signal as an input video signal to the video signal amplifying means; and comparing means for comparing levels of detection outputs of the writing light intensity detection means at times of generation of respectively the adjusting video signal of the white level and the adjusting video signal of the black level with reference levels corresponding to the white and black levels, whereby offset and gain of the video signal amplifying means are changed in accordance with comparison outputs of the comparing means.

The present photoconductive liquid crystal light valve display apparatus with a writing light intensity adjusting function causes the adjusting video signal generating means to generate an adjusting video signal having white and black levels, causes the selective supply means to supply the adjusting video signal as an input video signal to the video signal amplifying means, causes the comparing means to compare the levels of detection outputs of the writting light intensity detection means, which detects an impedance across the two electrodes of the liquid crystal light valve, at times of generation of respectively the adjusting video signal of the white level and the adjusting video signal of the black level with reference levels corresponding to the white and black levels, and changes the offset and gain of the video signal amplifying means in accordance with the comparison outputs of the comparing means.

DETAILED DESCRIPTION OF THE PREFERRED EMBODIMENTS

Preferred embodiments of the present invention will now be described referring to the accompanying drawings.

Figure 1:
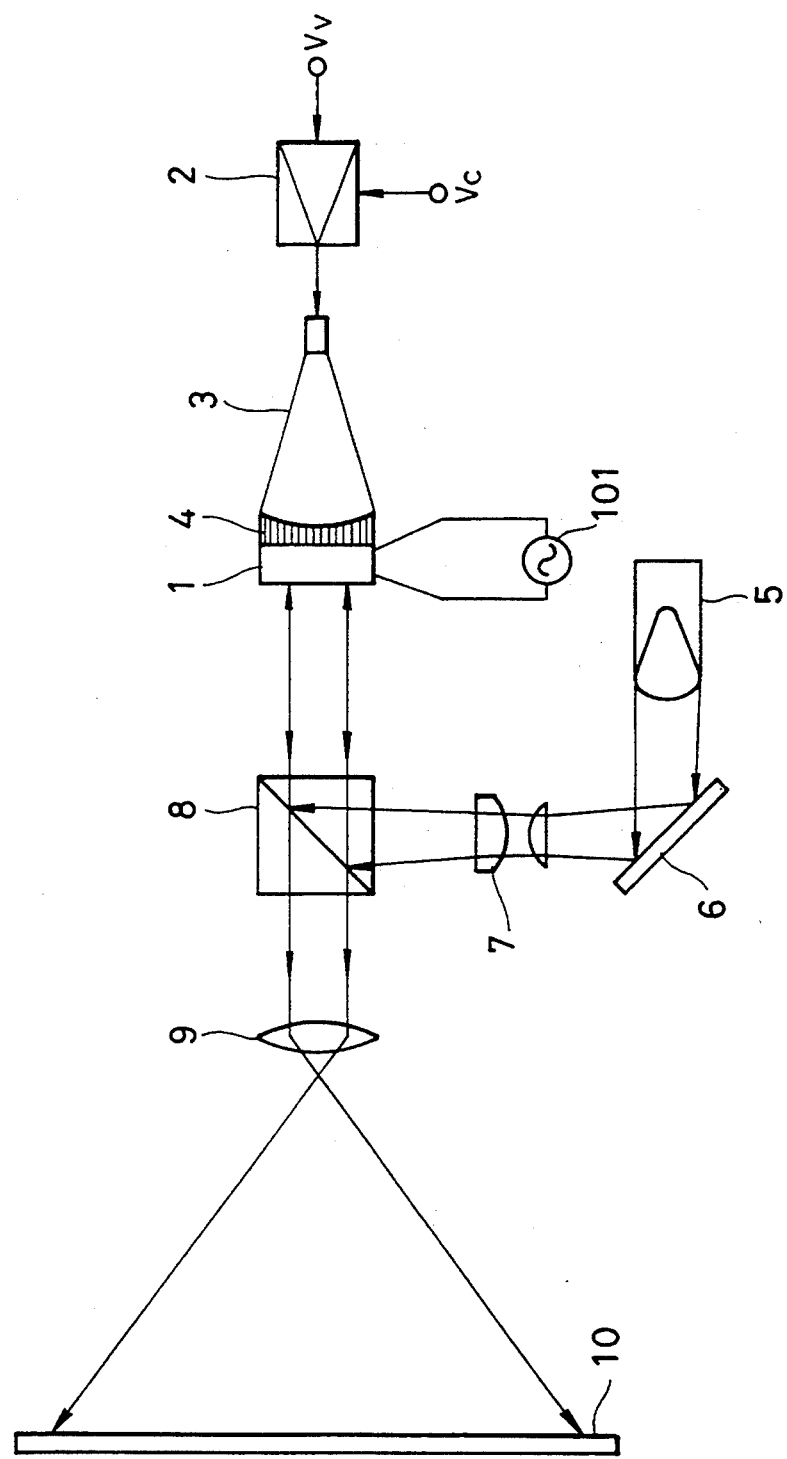
FIG. 1 is a diagram illustrating the structure of a conventional projection type LCD apparatus.
Figure 5:
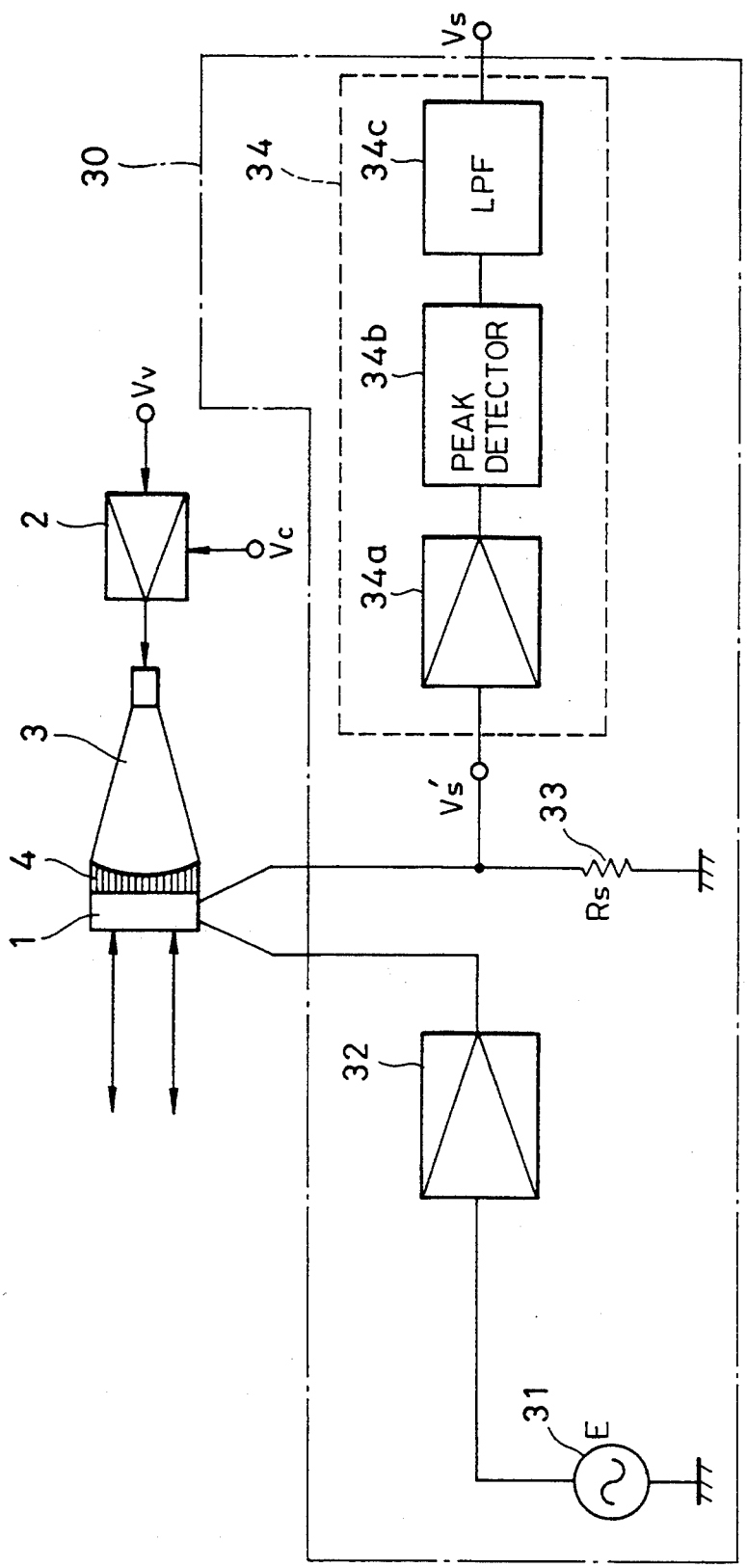
FIG. 5 is a block diagram of a projection type LCD apparatus, showing one example of writing light intensity detection means that is part of the present invention.

FIG. 5 presents a block diagram of a projection type LCD apparatus, showing an example of writing light intensity detecting means which is part of the present invention. FIG. 5 uses the same reference numerals as used in FIG. 1 to denote corresponding or equivalent components, and those portions unnecessary in the following description are omitted from the diagram.

Referring to FIG. 5, a drive voltage source 31 generates a sinusoidal drive voltage signal E and sends the output signal to one of the two electrodes of a liquid crystal light valve 1 via a drive amplifier 32. The other electrode of the liquid crystal light valve 1 is connected to the input terminal of a detection circuit 34 as well as grounded via a detecting resistor 33. The drive voltage signal E may be of a rectangular shape.

The detecting resistor 33 serves to detect a change in impedance of the liquid crystal light valve 1 due to the incident writing light. The intensity of the writing light irradiated on the liquid crystal light valve 1 from a CRT 3 is measured by monitoring the voltage across that detecting resistor 33 when the light valve 1 is driven by the drive voltage signal E.

The detection circuit 34 includes an amplifier 34a, a peak detector 34b and a low-pass filter 34c, and outputs the voltage $V_S'$ across the detecting resistor 33 as a detection signal $V_S$ in a predetermined form. For instance, the detection circuit 34 can inform a user of the intensity of the writing light by presenting a display corresponding to the signal voltage level on the operation section, or send information data of the same voltage level to a system controller so that the controller can perform control according to the writing light intensity.

When finding out that the writing light output of the CRT 3 does not have a predetermined intensity, therefore, the user or the system controller can compensate for the writing light intensity of the CRT 3 using a control signal $V_c$. Since the intensity of the writing light of the CRT 3 is measured using the photosensitivity of the light valve 1 itself, not a photometer in particular, the compensation is accomplished easily without detaching the light valve 1 from the CRT 3 unlike in the prior art.

A description will now be given of the principle of measuring the light writing characteristic of the CRT 3 using the mentioned detecting resistor.

Figure 2:
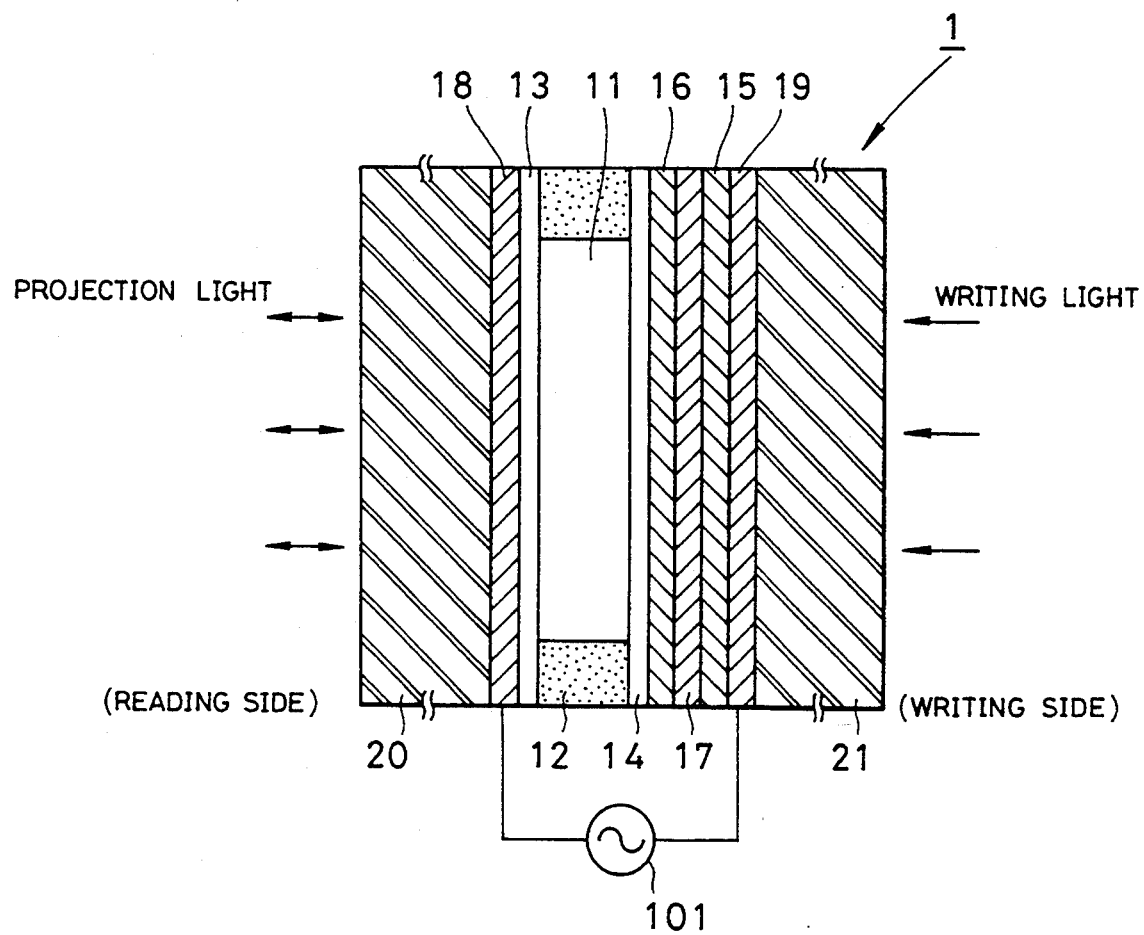
FIG. 2 is a diagram showing the structure of a photoconductive liquid crystal light valve.
Figure 3:
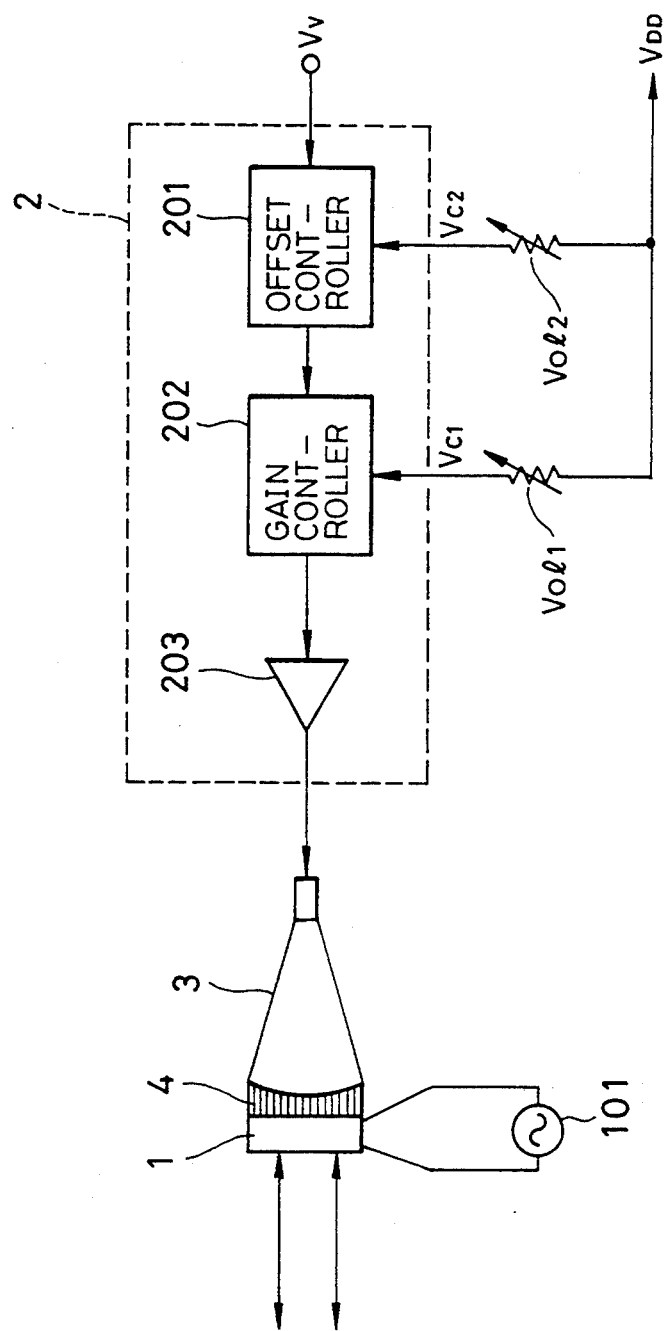
FIG. 3 is a diagram illustrating the structure of a video amplifier shown in FIG. 1.
Figure 4:
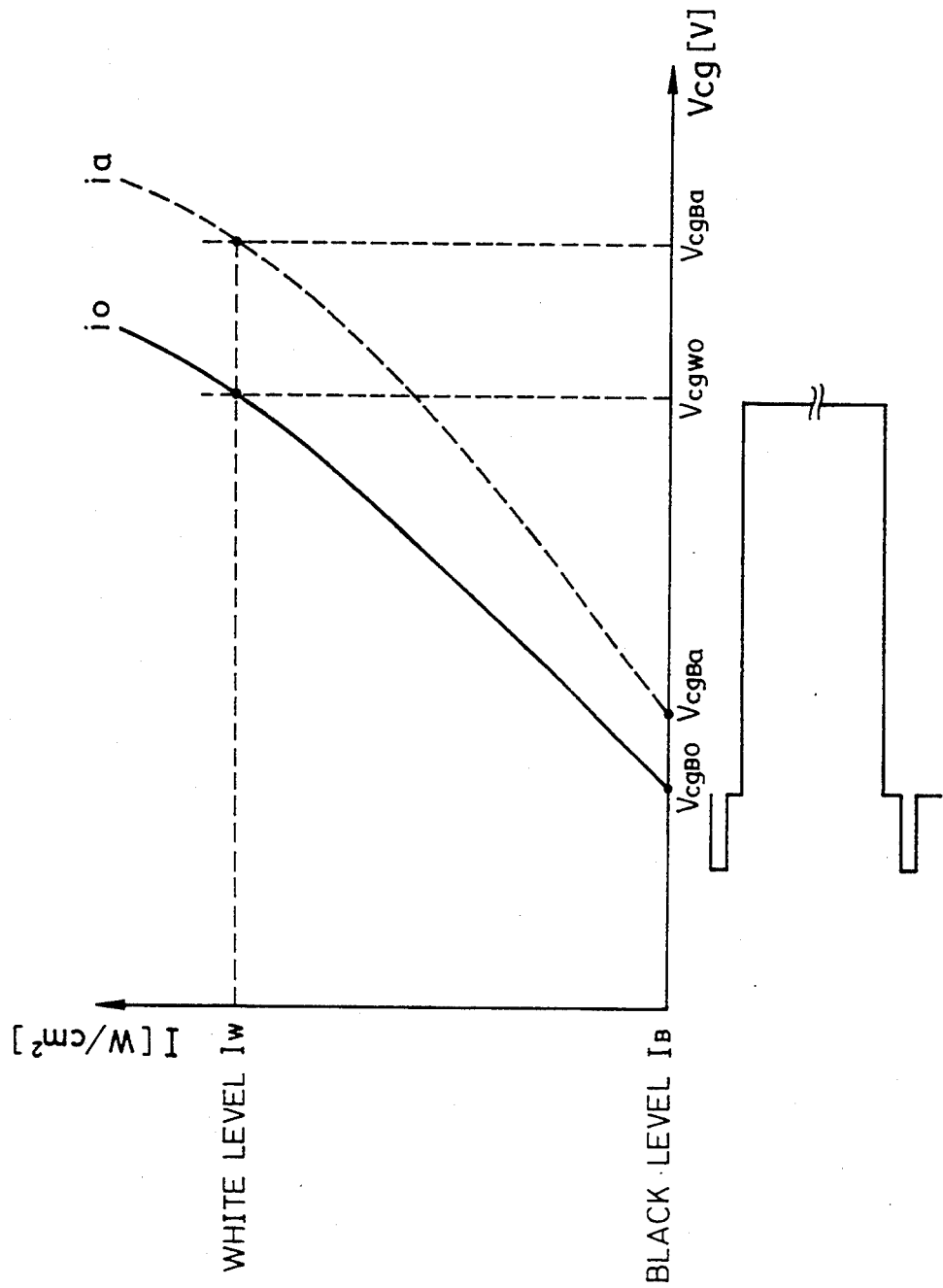
FIG. 4 is a diagram showing characteristics of the output light levels of a CRT to the voltages applied across the cathode and grid of the CRT.
Figure 6:
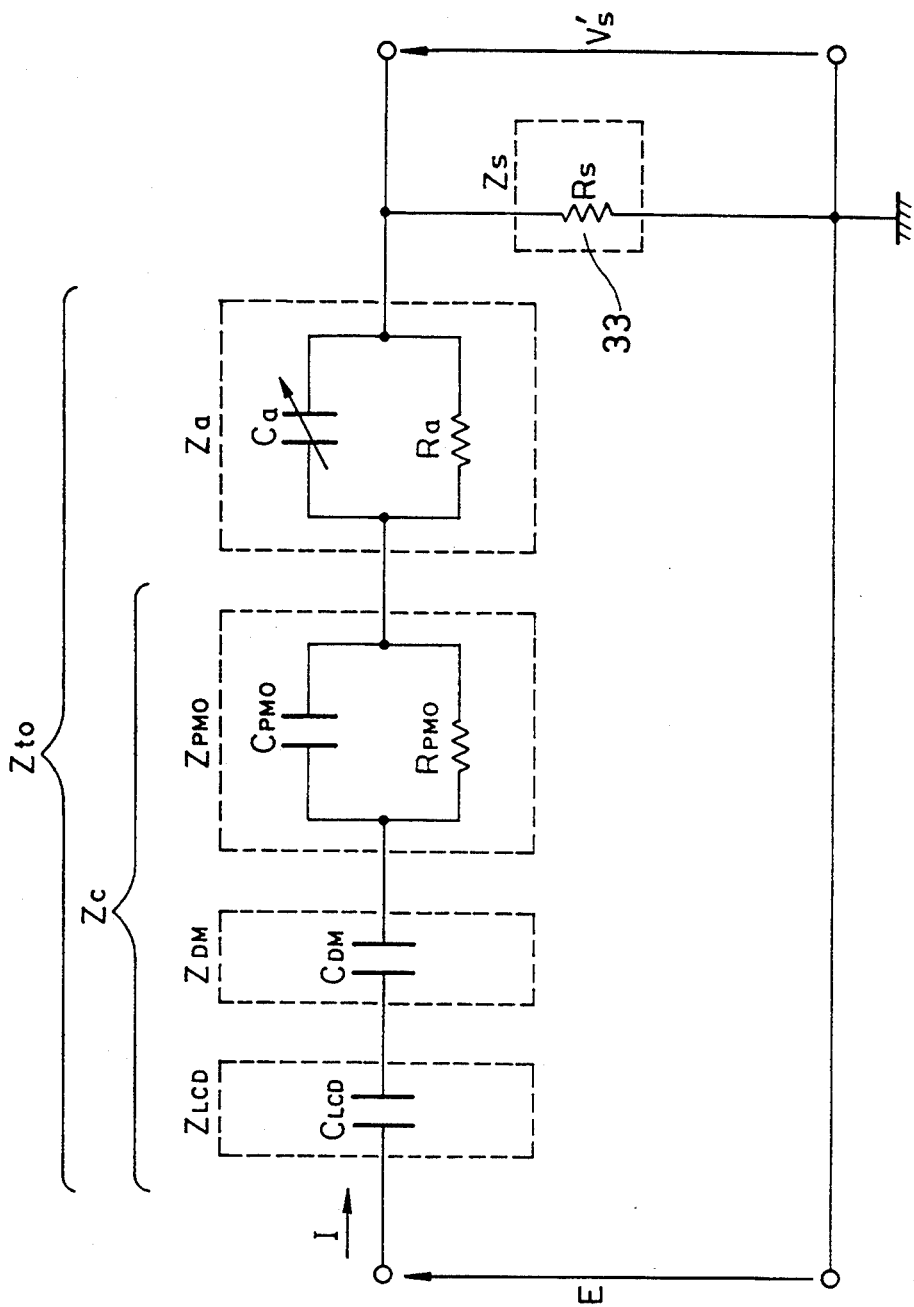
FIG. 6 is an equivalent circuit diagram of a display apparatus in FIG. 3.

Given that the impedances of the liquid crystal layer 11, dielectric mirror 16, light shielding film 17 and photoconductive film 15 of the liquid crystal light valve 1 as shown in FIG. 2 are $Z_{LCD}$, $Z_{DM}$, $Z_{PMO}$ and Za, the above display apparatus can be expressed as an equivalent circuit of a concentrated constant system as shown in FIG. 6. In FIG. 6, the individual impedances are defined as follows:

$$Z_{LCD} = 1/(j\omega C_{LCD}) \quad (1)$$

$$Z_{DM} = 1/(j\omega C_{DM}) \quad (2)$$

$$Z_{PMO} = 1/(1/R_{PMO} + j\omega C_{PMO}) \quad (3)$$

$$Za = 1/(1/Ra + j\omega Ca) \quad (4)$$

$$Zc = Z_{LCD} + Z_{DM} + Z_{PMO} \quad (5)$$

$$Zto = Zc + Za \quad (6)$$

where $C_{LCD}$, $C_{DM}$, $C_{PMO}$, Ca, $R_{PMO}$ and Ra are the capacitances and resistances for the associated impedances. It should be noted that $\omega = 2\pi f$ (f: frequency of drive voltage E) and is expressed with a unit imaginary number "j."

Of those impedances, it is Za, the impedance of the photoconductive film 15, and $Z_{LCD}$, the impedance of the liquid crystal layer 11 changed by the dielectric constant, that are changed by the writing light intensity. But, a change in $Z_{LCD}$ is so sufficiently small as compared with a change in Za that it may be negligible. Thus, it may be considered that only the impedance Za varies with the writing light.

Figure 7:
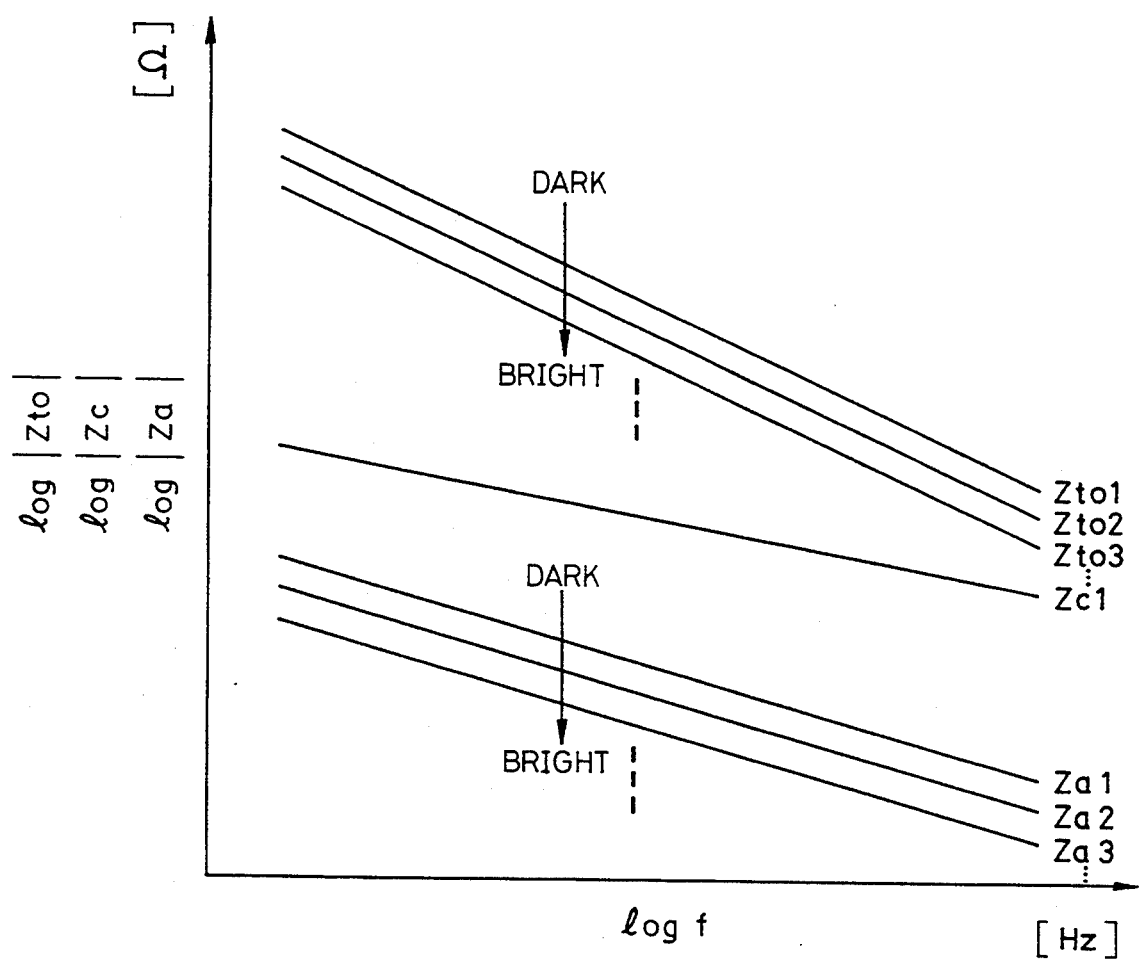
FIG. 7 is a diagram showing characteristics of the impedances to the drive voltage frequencies for individual writing light intensities according to one embodiment of the present invention.

The solid lines $za_1$, $za_2$, and $za_3$ in FIG. 7 represent the characteristics of the impedances Za of the photoconductive film 15 to the drive voltage frequencies f for the individual writing light levels (bright to dark). Those lines show that the impedance Za becomes smaller with an increase in the intensity of the writing light. The solid line $Zc_1$ in FIG. 7 represents the characteristic of the combined impedance Zc of the liquid crystal layer 11, dielectric mirror 16 and light shielding film 17 to the drive voltage frequency f, and it is apparently constant regardless of the intensity of the writing light. Thus, the characteristic for the total impedance Zto of the liquid crystal light valve 1 becomes as indicated by the solid lines $zto_1$, $zto_2$, and $zto_3$ in FIG. 7. Likewise, it is apparent that the impedance Zto becomes smaller with an increase in the intensity of the writing light. The actual drive voltage frequency in this case ranges 1 kHz to 10 kHz in which range the impedance of the light valve 1 can be estimated as an almost capacitive impedance. A change in the writing light output of the CRT 3 may be detected by detecting $\Delta Za$, a change in the impedance Za, or $\Delta Zto$, a change in Zto.

The following will describe how to detect such a change $\Delta Za$ or $\Delta Zto$.

Given that the impedance of the detecting resistor 33 is $Z_S$ and the drive voltage is E in FIG. 6, the current I flowing in the circuit is $$I = E/(Zto + Z_S) \quad (7)$$

The voltage $V_S'$ across the detecting resistor 33 is $$\begin{aligned} V_S' &= I \cdot Z_S \\ &= E \cdot Z_S/(Zto + Z_S) \end{aligned} \quad (8)$$

Assuming $Z_S = R_S$ and $|Zto| \gg Z_S$, the voltage $V_S'$ representing a change in the impedance $|Za|$ becomes $$V_S' \approx E \cdot R_S/Zto \quad (9)$$

Figure 8:
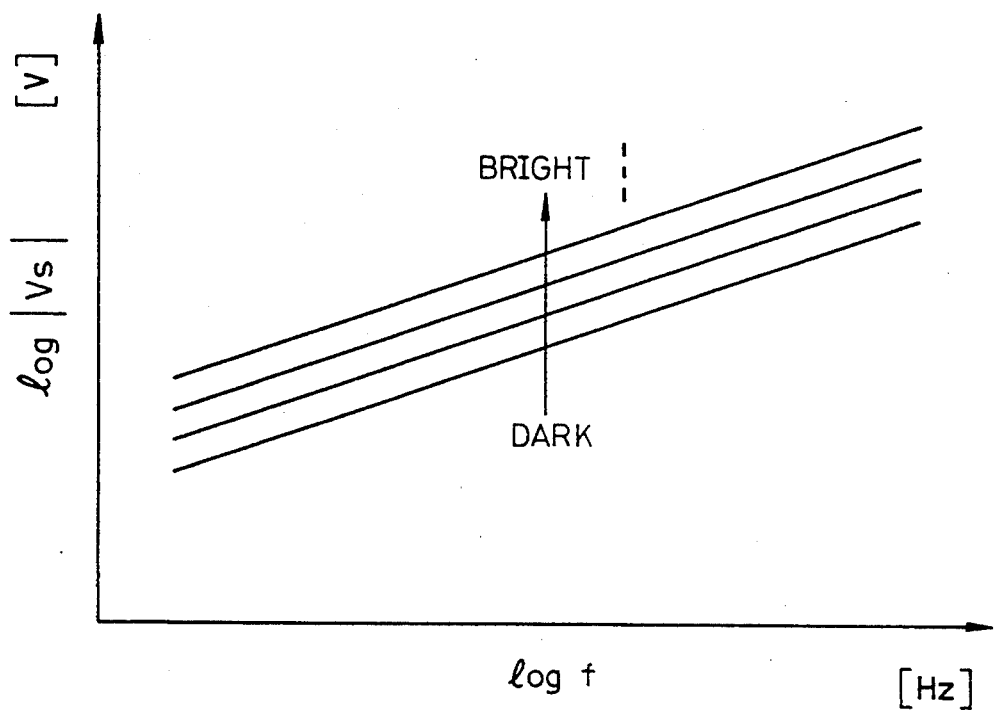
FIG. 8 is a diagram showing characteristics of the detected voltages to the drive voltage frequencies for individual writing light intensities according to this embodiment.
Figure 9:
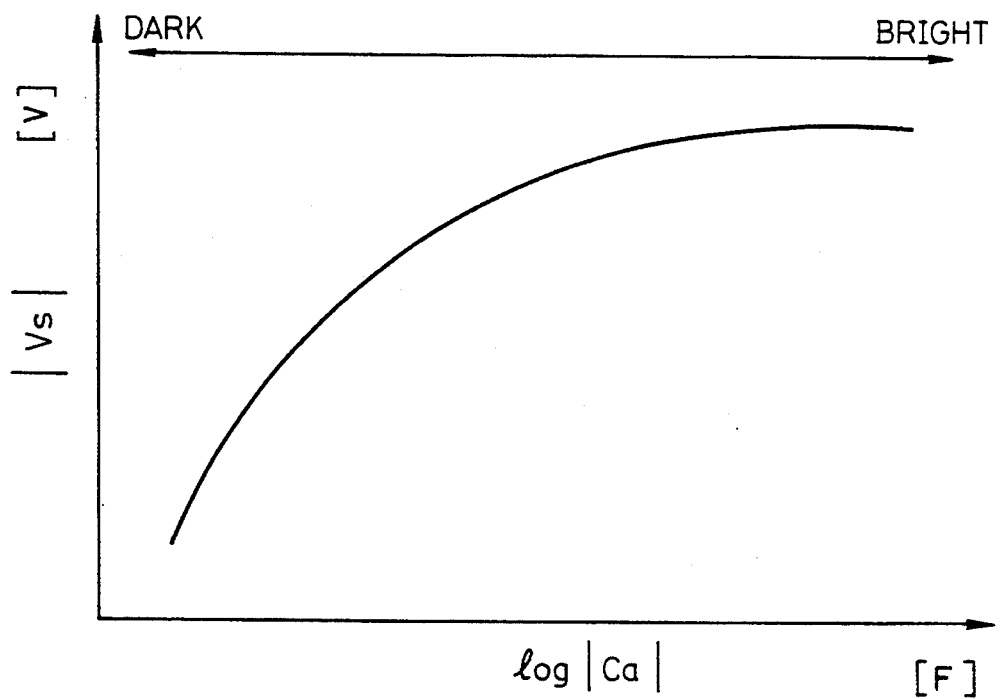
FIG. 9 is a diagram showing a characteristic of the detected voltage to the capacitance of a photoconductive film according to this embodiment.
Figure 10:
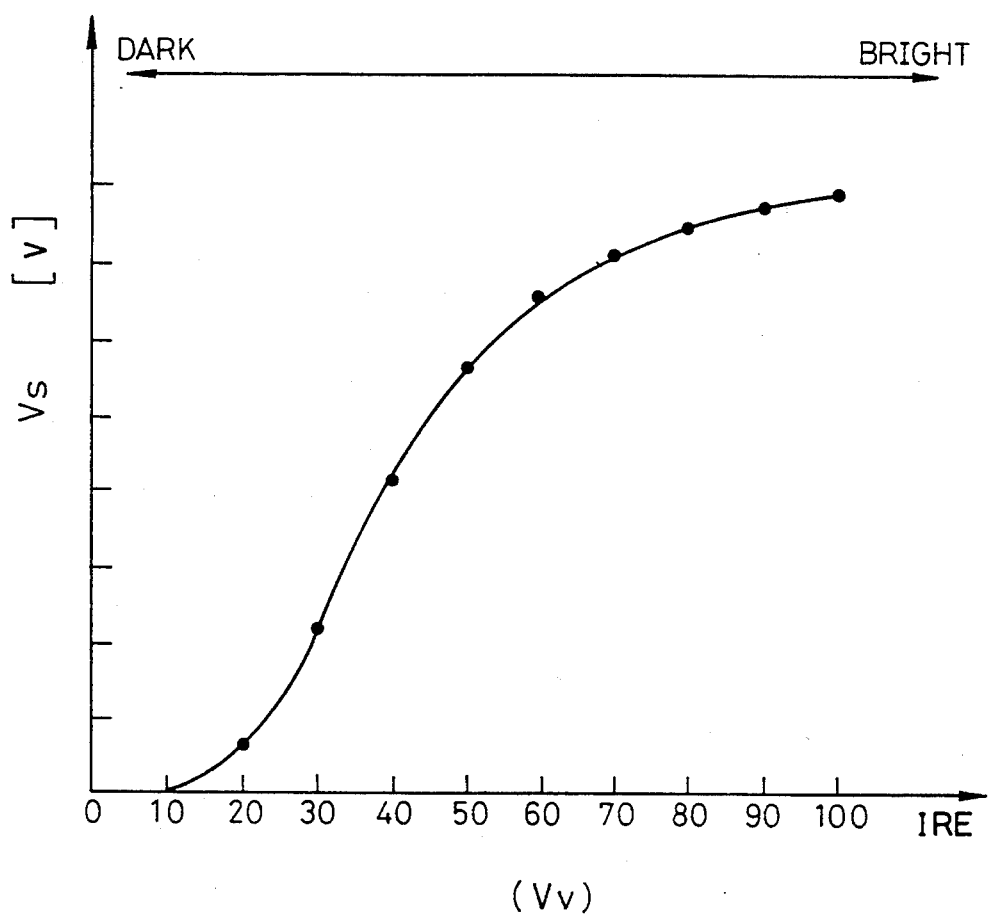
FIG. 10 is a diagram showing a characteristic of the detected voltage to the input video signal of the CRT shown in FIG. 5.

As the impedance Zto changes with the intensity of the writing light as shown in FIG. 7, the characteristic of the detected voltage $V_S$ becomes as shown in FIG. 8. FIG. 9 shows the detected voltage $V_S$ to a change in capacitance Ca for a given drive voltage and its frequency. As the capacitance Ca depends on the writing light intensity, the writing light intensity can be detected by measuring a change in capacitance Ca or a change in voltage $V_S$ corresponding thereto. FIG. 10 shows the results of the measurement of the detected voltage $V_S$ when a video signal $V_V$ corresponding to 0 IRE to 100 IRE is supplied to the CRT 3 based on the expected change in the intensity of the writing light output of the CRT 3.

It should be noted that, in this embodiment, the voltage $V_S'$ across the detecting resistor 33 is transmitted through the amplifier 34a, the peak detector 34b and the low-pass filter 34c to acquire the detected voltage $V_S$.

Figure 11:
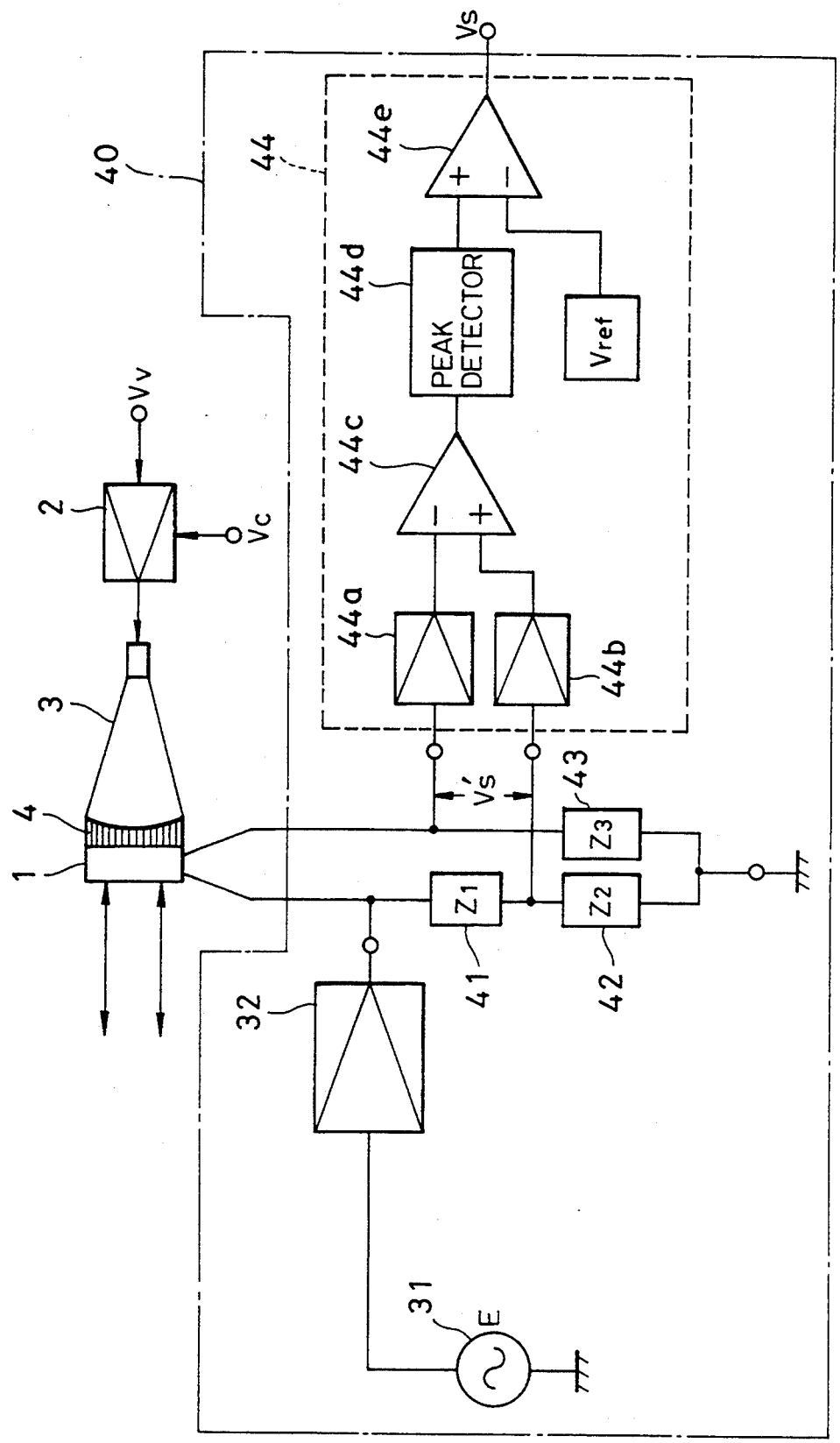
FIG. 11 is a block diagram of a projection type LCD apparatus, showing another example of the writing light intensity detection means that is part of the present invention.

FIG. 11 presents a block diagram of a projection type LCD apparatus, showing another example of writing light intensity detecting means which is part of the present invention. FIG. 11 uses the same reference numerals as used in FIG. 5 to denote corresponding or equivalent components.

To detect a change in the impedance of the liquid crystal light valve 1 with the writing light output of the CRT 3 in this embodiment, a bridge circuit is constituted with three impedance elements and the light valve 1, and a drive voltage signal is supplied to the bridge circuit to acquire a detected voltage similar to the one mentioned previously. More specifically, the bridge circuit to provide the detected voltage is constituted as follows. Referring to FIG. 11, one electrode of the light valve 1 is connected to one end of a first impedance element 41 with its node serving as one input terminal of the bridge circuit, the other end of the first impedance element 41 is connected to one end of a second impedance element 42 with its node serving as one output terminal of the bridge circuit, the other end of the second impedance element 42 is connected to one end of a third impedance element 43 with its node serving as the other input terminal, and the other end of the third impedance element 43 is connected to the other electrode of the light valve 1 with its node serving as the other output terminal. The drive voltage signal from the drive amplifier 32 is supplied across the two input terminals of the bridge circuit, and the voltage $V_S'$ across them is detected by a detection circuit 44 located at the subsequent stage.

As the writing light intensity of the CRT 3 is measured by the bridge circuit using the photosensitivity of the light valve 1 itself, the same advantage of the previous embodiment can be acquired.

The detection circuit 44 includes amplifiers 44a and 44b, a differential amplifier 44c, peak detector 44d and a differential amplifier 44e, and outputs the voltage $V_S'$ acquired by the bridge circuit as a detection signal $V_S$ of a predetermined shape. The signal $V_S$ is used in the same manner as used in the previous embodiment.

A description will now be given of the principle of measuring the light writing characteristic of the CRT 3 using the bridge circuit.

Figure 12:
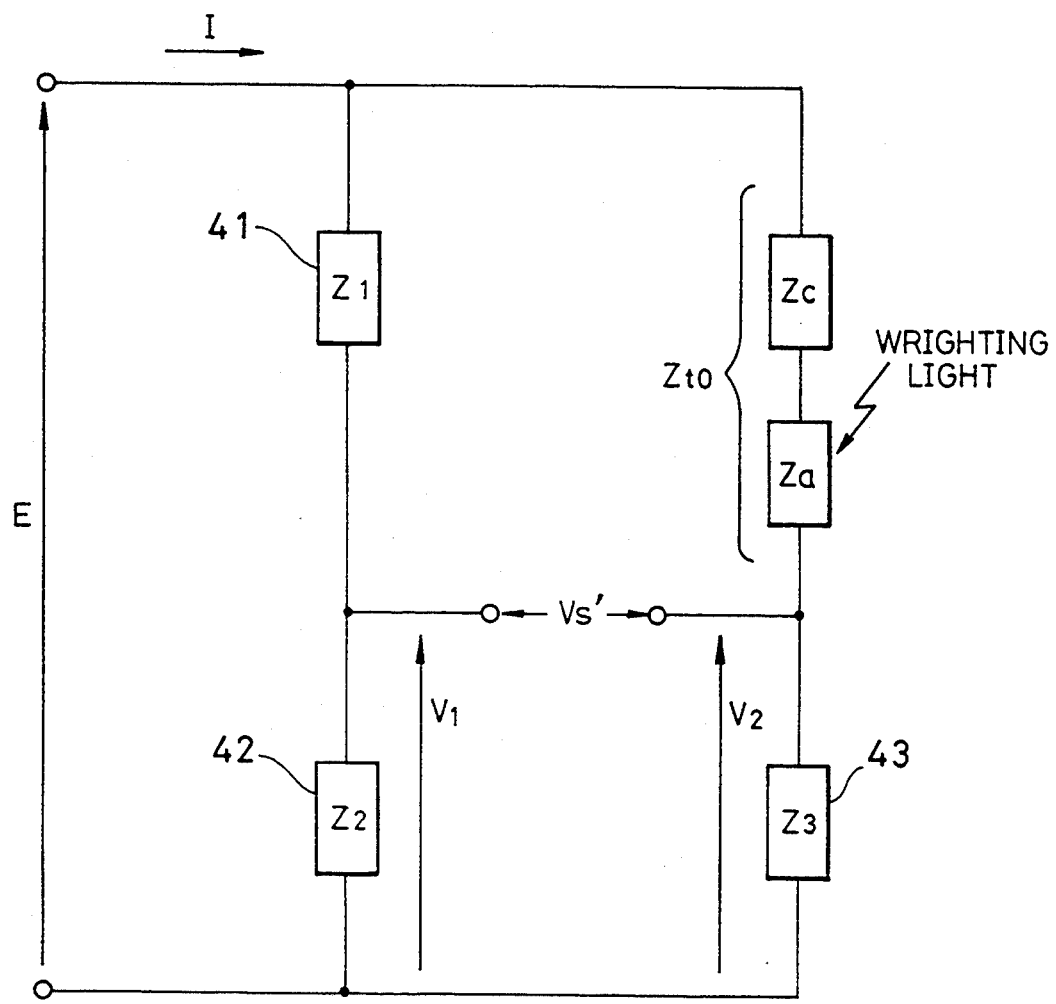
FIG. 12 is an equivalent circuit diagram of a display apparatus in FIG. 11.

Given that the impedances of the liquid crystal layer 11, dielectric mirror 16, light shielding film 17 and photoconductive film 15 of the liquid crystal light valve 1 as shown in FIG. 2 are $Z_{LCD}$, $Z_{DM}$, $Z_{PMO}$ and Za, and the impedances of the impedance elements 41 to 43 are $Z_1$, $Z_2$ and $Z_3$, the equivalent circuit of the display apparatus in FIG. 11 would be as shown in FIG. 12 as in the case of FIG. 6.

The voltages $V_1$ and $V_2$ respectively across the impedance elements 41 and 42 are $$V_1 = E \cdot Z_2/(Z_1+Z_2) \tag{10}$$

$$V_2 = E \cdot Z_3/(Zc+Za+Z_3) \tag{11}$$

Thus, the voltage $V_S'$ across the output terminals is $$\begin{aligned} V_S' &= V_1 - V_2 \\ &= E(Z_2Zc - Z_1Z_3 + Z_2Za)/\{(Z_1+Z_2)(Zc+Za+Z_3)\} \end{aligned} \tag{12}$$

If the balance condition for the bridge circuit is given as $Z_2Zc = Z_1Z_3$, this equation can be rewritten as $$V_S' = E\{Z_2/(Z_1+Z_2)\} \cdot \{Za/(Zc+Za+Z_3)\} \tag{13}$$

The resultant voltage $V_S'$ corresponds to a change in impedance Za.

Further, assuming $Z_1 \gg Z_2$ and $(Zc+Za) \gg Z_3$, then $V_S'$ can be approximated as $$\begin{aligned} V_S' &\approx E(Z_2/Z_1)\{Za/(Zc+Za)\} \\ &= E(Z_2/Z_1)\{1/(Zc/Za+1)\} \end{aligned} \tag{14}$$

Figure 13:
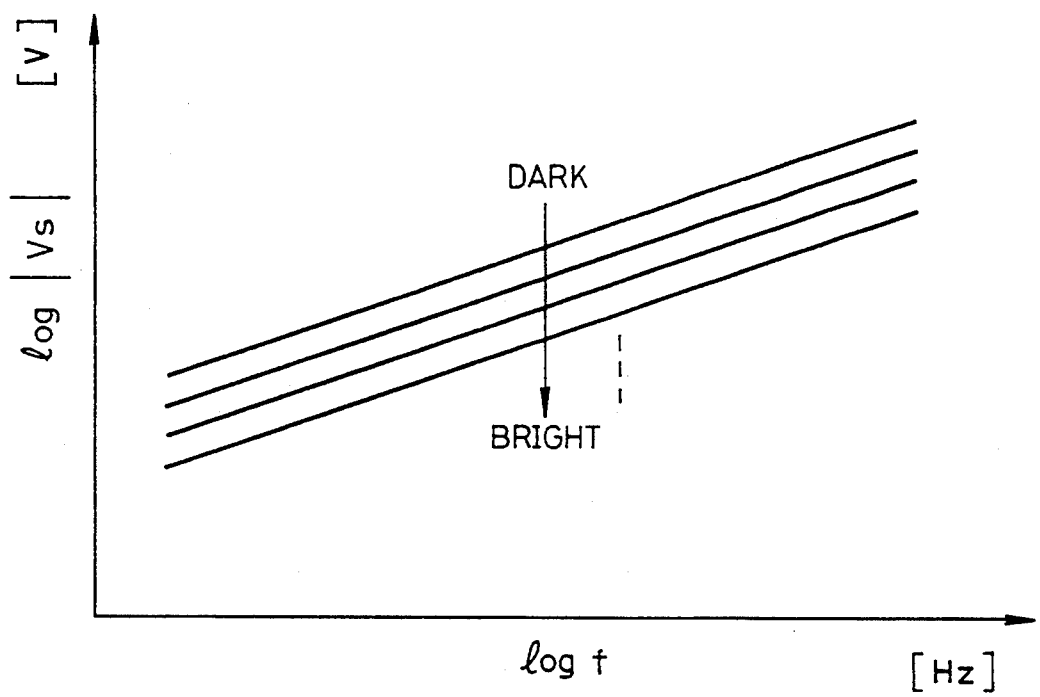
FIG. 13 is a diagram showing characteristics of the detected voltages to the drive voltage frequencies for individual writing light intensities according to another embodiment of the present invention.
Figure 14:
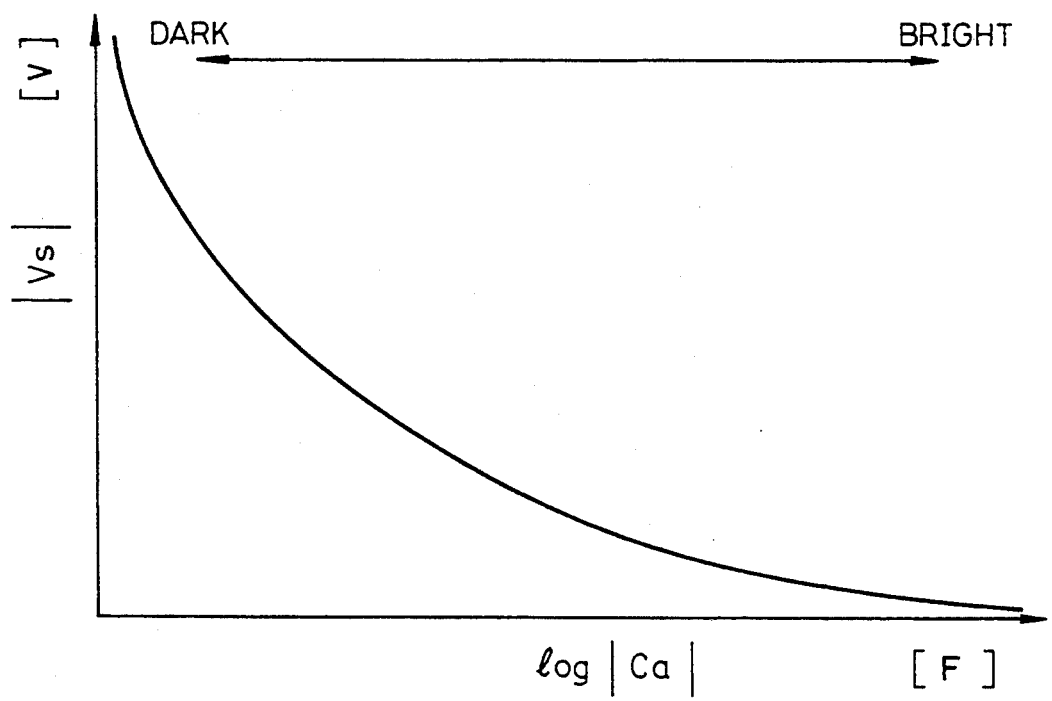
FIG. 14 is a diagram showing a characteristic of the detected voltage to the capacitance of a photoconductive film according to this embodiment.

Because the impedances Az and Zc change as in the case of FIG. 5, the detected voltage $V_S$ has a characteristic as shown in FIG. 13. FIG. 14 shows the detected voltage $V_S$ to a change in capacitance Ca for a given drive voltage and its frequency. As the capacitance Ca depends on the writing light intensity, the writing light intensity can be detected by measuring a change in capacitance Ca or a change in voltage $V_S$ corresponding thereto. Thus, the same measurement results as given in FIG. 10 in the previous embodiment can be obtained. It should be noted that, in this embodiment, the voltage $V_S'$ across the output terminals is passed through the amplifiers 44a and 44b, the differential amplifier 44c, the peak detector 44d and the differential amplifier 44e to acquire the detected voltage $V_S$.

A specific example of the mentioned balance condition will be described next.

With the balance condition of $Z_2Zc = Z_1Z_3$, if the impedance elements 42 and 43 are each realized by a resistor and $Z_2 = Z_3 = R$, then $$Zc = Z_1 \tag{15}$$

Setting $C_O = C_{LCD}C_{DM}/(C_{LCD}+C_{DM})$, the impedance Zc becomes $$Zc = 1/(j\omega C_O) + \{R_{PMO}/(1+j\omega C_{PMO}R_{PMO})\} \tag{16}$$

In other words, the impedance $Z_1$ of the impedance element 41 may be determined by the combined capacitance $C_O$, determined by the capacitances of the liquid crystal layer 11 and dielectric mirror 16 of liquid crystal light valve 1, and the resistance component $R_{PMO}$ and capacitance CPMO Of the light shielding film 17.

When the angular frequency of the drive voltage, $\omega$, is $\omega = 1/(C_{PMO}R_{PMO})$, the impedance $Z_{PMO}$ of the light shielding film 17, which is $$Z_{PMO} = R_{PMO}/(1+j\omega C_{PMO}R_{PMO}) \tag{17}$$

is approximated to be $$Z_{PMO} \approx 1/(j\omega C_{PMO}) \tag{18}$$

Thus, $$Z_c \approx 1/(j\omega C_0) + 1/(j\omega C_{PMO}) \quad (19)$$
$$= 1/(j\omega C)$$
$$\therefore C = C_0 C_{PMO}/(C_0 + C_{PMO})$$

The impedance $Z_1$ apparently becomes a capacitance component alone.

It has been explained in the descriptions of the two embodiments that the impedance $Z_{to}$ changes depending only on the writing light. In the case of a constant writing light intensity, however, a change in the impedance of the liquid crystal light valve itself can be known by detecting a change in impedance $Z_{to}$ or a change in detected voltage $V_S$.

Figure 15:
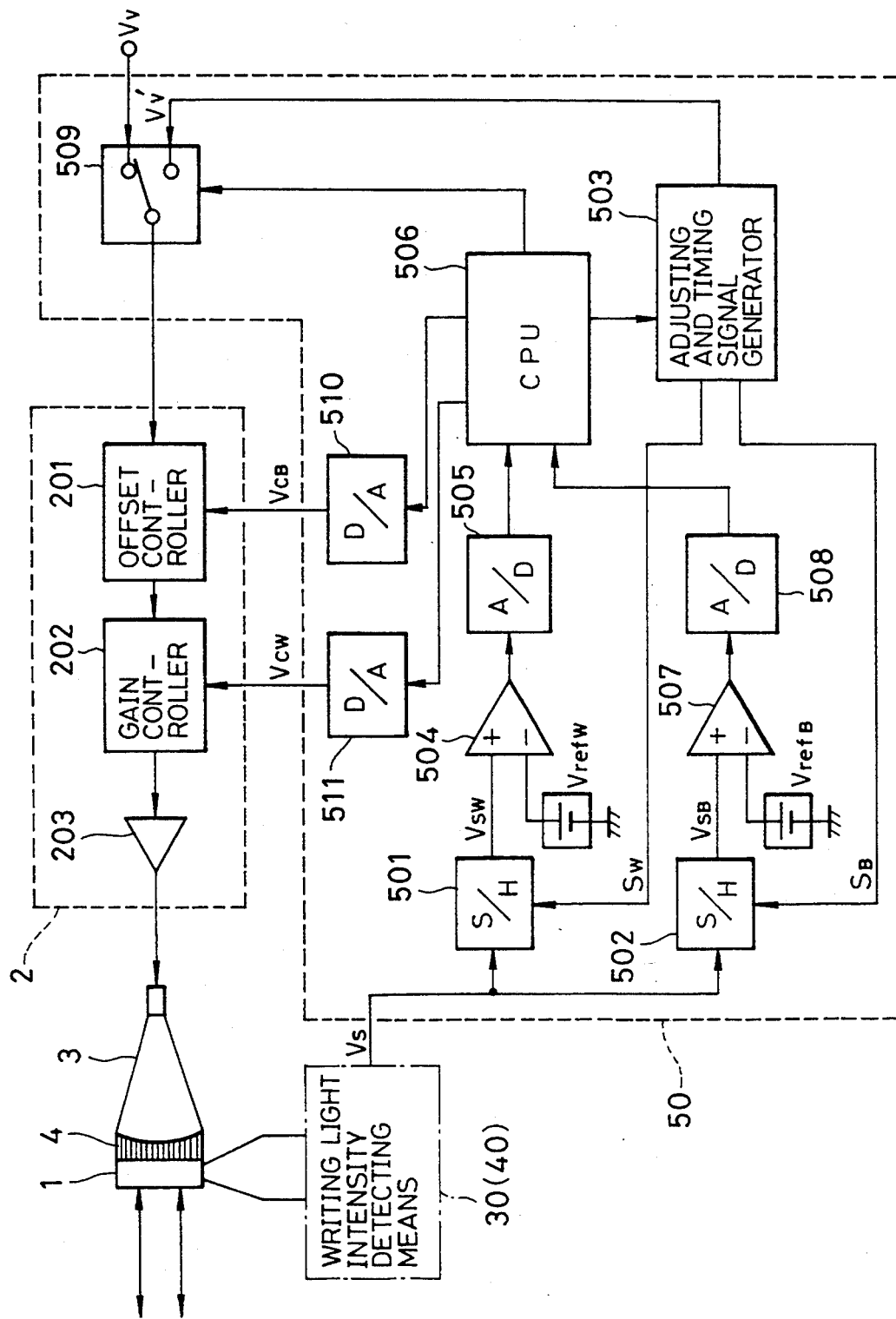
FIG. 15 is a block diagram of a projection type LCD apparatus according to one embodiment of the present invention.

FIG. 15 presents a block diagram of a projection type LCD apparatus according to the present invention, which comprises the writing light intensity detecting means of each of the described embodiments.

In FIG. 15, the detected voltage $V_S$ output from writing light intensity detecting means 30 (or 40) is supplied to sample/hold circuits 501 and 502 of writing light intensity adjusting means 50. The sample/hold circuit 501 supplies the detected voltage $V_S$, sampled at a sampling pulse $S_W$ from an adjusting video signal (hereinafter simply called "adjusting signal) and timing signal generator 503, to one input terminal of a differential amplifier 504. The differential amplifier 504 receives a reference voltage $V_{refW}$ at the other input terminal, and supplies the comparison output across the input terminals to a CPU 506 via an A/D converter 505. The other sample/hold circuit 502 supplies the detected voltage $V_S$, sampled at a sampling pulse $S_B$ from the adjusting and timing signal generator 503, to one input terminal of a differential amplifier 507. The differential amplifier 507 receives a reference voltage $V_{refB}$ at the other input terminal, and supplies the comparison output across the input terminals to the CPU 506 via an A/D converter 508.

The output signal of a selector 509 is supplied to the signal input terminal of the video amplifier 2. The selector 509 receives an input video signal $V_V$ in normal operation mode at one input terminal, and receives an adjusting signal $V_{V'}$ from the adjusting and timing signal generator 503 at the other input terminal. The selector 509 sends one of the received signals to the video amplifier 2 in response to a select signal from the CPU 506.

The adjusting and timing signal generator 503 generates the adjusting signal $V_{V'}$ and sampling pulses $S_B$ and $S_w$ in accordance with the control signal from the CPU 506.

The CPU 506 sends the control signal and the select signal to the signal generator 503 and offset control data and gain control data for the video amplifier 2 respectively to D/A converters 510 and 511, based on the output data of the A/D converters 505 and 508 and an instruction signal from the operation section (not shown). The offset and gain of the video amplifier 2 are altered in accordance with the outputs of those D/A converters 510 and 511.

The operation of the thus constituted display apparatus will be described referring to FIG. 16.

When an adjustment start instruction to regulate the light writing characteristic of the CRT 3 is sent to the CPU 506 from the operation section (not shown) or immediately upon power-on and the CPU 506 generates the select signal in response to the instruction, the selector 509 relays a signal applied at the other input terminal, that is, the output adjusting signal from the adjusting and timing signal generator 503, to the video amplifier 2. The relayed adjusting signal has a waveform that alternately has a white level (100 IRE) and a black level (0 IRE) every T sec, for example, as shown in (a) in FIG. 16. The CRT 3 outputs an image of a luminance level corresponding to the white or black level and writes it on the liquid crystal light valve 1. The detected voltage $V_S$ output from the writing light intensity detecting means 30 therefore becomes as shown in (b) in FIG. 16.

Figure 16:
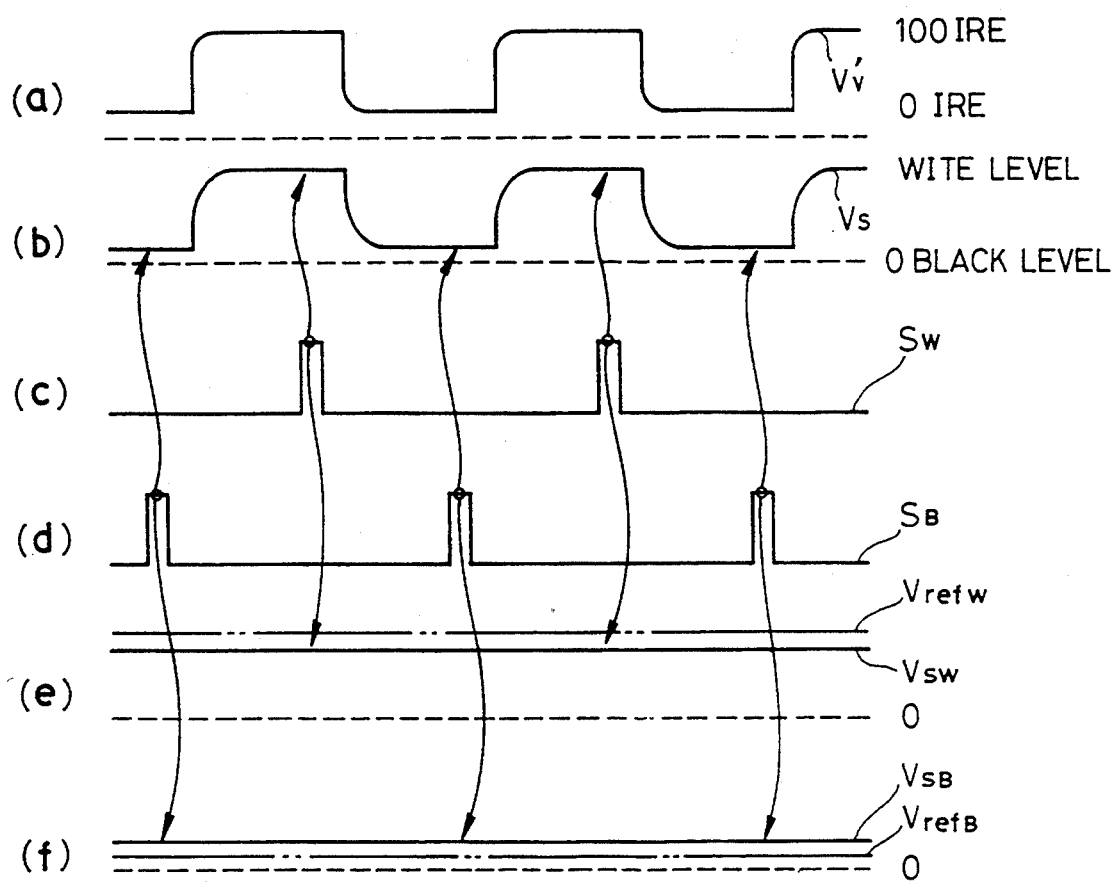
FIG. 16 is a waveform diagram for explaining the operation of the embodiment shown in FIG. 15.

In response to the control signal from the CPU 506, the adjusting and timing signal generator 503 generates the sampling pulse $S_B$ or $S_W$ as shown in (c) or (d) in FIG. 16 when the detected voltage $V_S$ becomes stable while keeping the constant phase relation with the adjusting signal. In response to those sampling pulses, the sample/hold circuits 501 and 502 sample the detected voltage $V_S$ and thus send the sampled detected voltage $V_{SW}$ of a white level and the sampled detected voltage $V_{SB}$ of a black level, as shown in (e) and (d) in FIG. 16, to the differential amplifiers 504 and 507, respectively. The sampled detected voltages are compared with the reference voltages $V_{refW}$ and $V_{refB}$ corresponding to predetermined white and black levels, and signals representing the amounts of shift from the proper white and black levels are sent to the CPU 506 after digitization in the A/D converters 505 and 508.

Based on the data from the A/D converters 505 and 508, the CPU 506 produces offset control data and gain control data for the video amplifier 2 in such a way that the sampled detected voltages $V_{SW}$ and $V_{SB}$ become equal to the reference voltages $V_{refW}$ and $V_{refB}$, respectively. Those control data are converted into analog signals in the D/A converters 510 and 511 and sent as an offset control signal $V_{CB}$ and a gain control signal $V_{CW}$ to a gain controller 202 and an offset controller 201. As the offset and gain of the video amplifier 2 are controlled in accordance with the control signals $V_{CW}$ and $V_{CB}$ from the writing light intensity adjusting means 50, the white level dependent on the offset level of the input video signal to the CRT 3 and the black level dependent on the gain can be changed to the desired levels.

At the same time, the CPU 506 determines whether or not the data from the A/D converters 505 and 508 fall within predetermined allowances. In the predetermined allowances, the detected voltages $V_{SW}$ and $V_{SB}$ are considered as proper. If the either data is within its predetermined allowance, the CPU 506 judges that no further offset and gain controls are necessary for the video amplifier 2 and stops receiving the mentioned pieces of data and producing the control data. The CPU 506 also issues a control signal to cause the adjusting and timing signal generator 503 to stop generating the individual signals and puts out the select signal to the selector 509. Further, the CPU 506 holds the offset and gain control data at this time and keeps supplying the held data to the D/A converters 510 and 511 thereafter. The adjustment for the proper black and white levels is thus achieved.

As the offset and gain of the video amplifier 2 are controlled automatically based on the detected voltage $V_S$ in this embodiment, it will take a short time to adjust the black and white levels of the CRT 3 from the generation of the adjusting start instruction and the adjustment will always fall within a predetermined allowance, thus ensuring accurate regulation. As the adjustment can start with a simple and easy operation and the writing light can be adjusted upon every power-on, this invention is effective particularly in dealing with the aforementioned time series deterioration of a CRT.

In short, the driving apparatus for a photoconductive liquid crystal light valve having a writing light intensity detecting function according to the present invention is designed to detect the impedance across two electrodes of the liquid crystal light valve, thus ensuring simple detection of the light writing characteristic of the light writing means without detaching the light writing means, such as a CRT, from the liquid crystal light valve.

The photoconductive liquid crystal light valve display apparatus having a writing light intensity adjusting function according to the present invention causes the adjusting video signal generating means to generate an adjusting video signal having white and black levels, causes the selective supply means to supply the adjusting video signal as an input video signal to the video signal amplifying means, causes the comparing means to compare the levels of detection outputs of the writing light intensity detection means, which detects an impedance across the two electrodes of the liquid crystal light valve, at times of generation of respectively the adjusting video signal of the white level and the adjusting video signal of the black level with reference levels corresponding to the white and black levels, and changes the offset and gain of the video signal amplifying means in accordance with the comparison outputs of the comparing means. This provides simple, prompt and accurate detection of the light writing characteristic of the light writing means, such as a CRT, without detaching the light writing means from the liquid crystal light valve.

What is claimed is:

1. A driving apparatus for a photoconductive liquid crystal light valve having a liquid crystal layer, a photoconductive layer and two electrodes arranged to sandwich said liquid crystal layer and photoconductive layer and designed to allow a writing light to be incident upon said photoconductive layer by light writing means coupled to a writing side, said driving apparatus comprising:

means for applying a drive voltage signal from a drive voltage source across said two electrodes; and detection means for detecting an impedance across said two electrodes for use in adjusting a luminous intensity of the writing light.

2. The driving apparatus according to claim 1, wherein said detection means comprises an impedance element provided between said drive voltage source and one of said two electrodes and detects a voltage drop of said impedance element.

3. The driving apparatus according to claim 1, wherein said detection means comprises a bridge circuit having two input terminals and two output terminals, having a node between one of said two electrodes and one end of a first impedance element as one input terminal, having a node between the other end of said first impedance element and one end of a second impedance element as one output terminal, having a node between the other end of said second impedance element and one end of a third impedance element as the other input terminal, having a node between the other end of said third impedance element and the other one of said electrodes as the other output terminal, whereby said drive voltage signal is supplied across said two input terminals, and detects a voltage across said two output terminals.

4. The driving apparatus according to claim 3, wherein impedances of said second and third impedance elements are set equal to each other, and an impedance of individual layers excluding said photoconductive layer of said photoconductive liquid crystal light valve is set equal to that of said first impedance element.

5. A photoconductive liquid crystal light valve display apparatus comprising:

a photoconductive liquid crystal light valve having a liquid crystal layer, a photoconductive layer and two electrodes arranged to sandwich said liquid crystal layer and photoconductive layer;

video signal amplifying means for amplifying an input video signal and outputting an output video signal;

light writing means, coupled to a writing side of said photoconductive liquid crystal light valve, for allowing a writing light corresponding to said output video signal to be incident upon said photoconductive layer;

drive means for applying a drive voltage signal across said two electrodes;

writing light intensity detection means for detecting an impedance across said two electrodes;

adjusting video signal generating means for generating an adjusting video signal having a white level and a black level;

selective supply means for supplying said adjusting video signal as an input video signal to said video signal amplifying means;

comparing means for comparing levels of detection outputs of said writing light intensity detection means at times of generation of respectively said adjusting video signal of said white level and said adjusting video signal of said black level with reference levels corresponding to said white and black levels; and means for changing offset and gain of said video signal amplifying means in accordance with comparison outputs of said comparing means.

6. A driving and adjusting apparatus for a photoconductive liquid crystal light valve having a liquid crystal layer, a photoconductive layer and two electrodes arranged to sandwich said liquid crystal layer and photoconductive layer and designed to allow a writing light to be incident upon said photoconductive layer by light writing means coupled to a writing side, said drive and adjusting apparatus comprising:

means for applying a drive voltage signal from a drive voltage source across said two electrodes;

detection means for detecting an impedance across said two electrodes and outputting a detected writing light intensity signal corresponding to the detected impedance; and adjusting means for adjusting a luminous intensity of the writing light in response to the detected writing light intensity signal.

7. The driving apparatus according to claim 6, wherein said detection means comprises an impedance element provided between said drive voltage source and one of said two electrodes and detects a voltage drop of said impedance element.

* * * * *